though a finely-divided solid is preferred. Useful solid carriers include natural and synthetic clays and silicates, for example, natural silicas such as diatomaceous earths; magnesium silicates e.g. talcs; magnesium aluminium silicates, e.g. attapulgites and vermiculites; aluminium silicates, e.g. kaolinites, montmorillonites and micas; calcium carbonate; calcium sulphate; synthetic hydrated silicon oxides and synthetic calcium or aluminium silicates; elements such as for example, carbon and sulphur; natural and synthetic resins such as for example, coumarone resins, polyvinyl chloride and styrene polymers and copolymers; solid polychlorophenols; bitumen; waxes such as, for example, beeswax, paraffin wax, and chlorinated mineral waxes; and solid fertilisers, for example superphosphates.

3,819,609

FUNGICIDAL-2-ALKOXY-5-HALOGENO-BENZENE DIAZONIUM CYANIDES

Maria Puklics, Lajos Guczoghy, Gyorgy Matolcsy, and Janos Bodnar, Budapest, Hungary, assignors to Chinoin Gyogyszer-és Vegyeszeti Termekek Gyora Rt., Budapest, Hungary
No Drawing. Filed July 7, 1971, Ser. No. 160,524
Claims priority, application Hungary, July 10, 1970,
CI-1,011
Int. Cl. A01n 17/08; C07c 113/04
U.S. Cl. 260—141                           1 Claim

ABSTRACT OF THE DISCLOSURE

A fungicidal compound of the formula

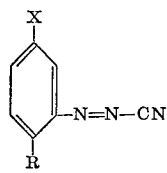

where X is fluorine, chlorine, bromine or iodine and R is a $C_1$–$C_7$ alkoxy group. The compound is made by diazotizing a compound having the formula

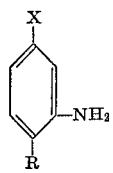

to produce a diazonium salt which is reacted, preferably without isolation, with an alkali metal cyanide.

SPECIFICATION

(1) Field of the Invention

This invention relates to new diazonium-cyanides, a process for the preparation thereof and pesticidal compositions containing the same. More particularly, it is concerned with 2-alkoxy-5-halogeno-benzene-diazonium-cyanides, a process for the preparation thereof and the use of said compounds as pesticides, particularly fungicides.

(2) Background of the Invention

It is known that certain benzene-diazonium-cyanides possess fungicidal properties. In French Medicine Patent BSM No. 6.339 4-cyano-, 3,4-dichloro-, 2,6-dichloro-, 2-dimethylamino-, and 2 - methyl - 4 - (N,N-diethylamino)-benzene-diazonium-cyanide are disclosed.

(3) Description of the Invention

According to a feature of the present invention there are provided new compounds of the formula I

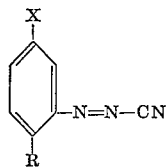

wherein R stands for lower alkoxy, and X stands for halogen.

The term "halogen" represents chlorine, bromine, fluorine and iodine. If R stands for a lower alkoxy group, it represents a straight or branched chain alkoxy group having 1–7, preferably 1–4 carbon atoms, such as methoxy, ethoxy, n-propoxy, and isobutoxy.

Particularly preferred compounds of the formula I are the following derivatives:

2-methoxy-5-chloro-benzene-diazonium-cyanide,
2-methoxy-5-bromo-benzene-diazonium-cyanide,
2-ethoxy-5-chloro-benzene-diazonium-cyanide,
2-ethoxy-5-bromo-benzene-diazonium-cyanide,
2-isopropoxy-5-chloro-benzene-diazonium-cyanide,
2-isobutoxy-5-bromo-benzene-diazonium-cyanide.

The 2 - methoxy - 5 - chloro-benzene-diazonium-cyanide possesses particularly useful properties.

The compounds of the formula I exhibit useful fungicidal, insecticidal, bactericidal and other pesticidal activities. The introduction of the alkoxy group into the molecule results in the improvement of the trans-locating ability, which contributes to the formation of an internal protection.

The significant advantage of the compounds of the formula I is that they possess an extremely wide spectrum. Thus the compounds are active against the following infections: *Botrytis cinera, Ascohyta pisi, Rhizoctonia solani, Monilia linhartiana, Manilia laxa, Sordaria makrospora, Alternaria tenuis, Botrytis allii, Candida albicans, Trychophyton mentagriphypos,* and *Trychophyton rubrum.*

According to a further feature of the present invention, the process for the preparation of compounds of the formula I, comprises diazotizing a compound of the formula II

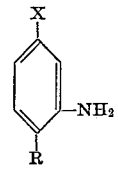

wherein X and R have the same meaning as stated above and reacting the diazonium salt thus formed with an alkali metal cyanide.

The formation of the diazonium salt may be carried out by techniques known per se. One may proceed preferably by dissolving the compound of the formula II in water and adding an aqueous solution of an alkali metal [(nitrite)] e.g. sodium nitrite or potassium nitrite/ in acidic medium under cooling. The acidic medium is provided preferably with mineral acids, such as hydrochloric acid or sulphuric acid. The aqueous solution of the alkali metal nitrite is added preferably at a temperature between 0° C. and —5° C.

The diazonium salt thus formed is reacted with an alkali metal cyanide after isolation or without isolation. The reaction is carried out preferably at a temperature of about 0° C. According to a preferred embodiment of the process, the diazonium salt is reacted with the alkali metal cyanide without isolation in the reaction mixture obtained by the preparation thereof.

The present invention also includes pesticidal, particularly fungicidal, compositions containing as active ingredient at least one compound of the formula I in admixture with suitable inert solid or liquid carriers or diluents.

The pesticidal compositions may be used by applying to the pests or to their habitat a biologically active amount of the compound of the formula I.

The term "carrier" as used herein means a material, which may be inorganic or organic and of synthetic or natural origin with which the active compound is mixed or formulated to facilitate its application to the plant, seed, soil, or other object to be treated. The carrier may be solid or a fluid. Any of the materials usually applied in formulating pesticides may be used as carrier.

Examples of suitable solid carriers are silicates, clays, synthetic hydrated silicon oxides, synthetic calcium silicates, bitumen, asphaltit, waxes, such as bees wax, paraffin wax, montan wax and solid fertilizers for example super-phosphate.

Examples of suitable fluid carriers are water, alcohols, such as isopropanol, ketones, such as acetone, aromatic hydrocarbons, such as benzene, ethers, such as diethyl-ether, and chlorinated hydrocarbons, such as carbon tetrachloride. Mixtures of different liquids are often suitable.

The compositions according to the present invention may contain wetting agents, emulsifying agents or dispersing agents. Said agents may be of cationic, anionic, or non-ionic character. Any of the surface active agents usually applied in formulating pesticides may be used. Examples of suitable surface active agents are the sodium or calcium salts of polyacrylic acids, the condensation product of fatty acid or aliphatic acid amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example p-octylphenol, or p-octylcresol, with ethylene oxide and/or propylene oxide; sulphates or sulphonates of these condensation products; and alkali metal salts, preferably sodium salts, of sulphuric or sulphonic acid esters containing at least 10 carbon atoms in the molecule, for example sodium lauryl sulphate, sodium secondary alkyl sulphates, sodium salts of sulphonated castor oil, and sodium alkylaryl sulphonates such as sodium dodecyl-benzene sulphonate.

The compositions of the invention may be formulated as wettable powder, dusts, granules, solutions, emulsifyable concentrates, emulsions and pastes. The compositions may be prepared by known methods by admixing the active ingredient with suitable carriers or diluents, if necessary in the presence of additives.

The compositions of the present invention may contain other ingredients for example protective colloides, such as gelatine, glue, caseine, gums, stabilizers, such as ethylene-diamine-tetra acetic acid, and other herbicides or pesticides.

Aqueous dispersions or emulsions may be prepared by diluting a wettable powder or an emulsifiable concentrate with water. The said emulsions may be of the water-in-oil or of the oil-in-water type.

The compositions of the present invention may be stored preferably in the form of a concentrate, having a high active ingredient content (e.g. between 20–80%). Said concentrate may be diluted prior to use with suitable solid or liquid diluents to the desired concentration.

The active ingredient content of the compositions of the present invention may vary within wide ranges. The active ingredient content is selected by taking into consideration the method of application, the type of the composition, the pests to be killed, etc.

Further details of our invention are to be found in the following Example, without limiting the scope of the invention.

EXAMPLE 1.3 g. (0.0082 mole) of 2-amino-4-chloro-anisole is dissolved in 6 ml. of water, whereupon 2.5 ml. of concentrated hydrochloric acid is added. The mixture is heated until the substance is dissolved, whereupon the solution is cooled with a mixture of salt and ice. At a temperature between 0° C. and −5° C., a solution of 0.6 g. of sodium nitrite in 2 ml. of water is added dropwise over a period of 30 minutes. The solution of the diazonium salt is neutralized with 11 ml. of 2 N sodium carbonate solution (pH=6.5).

0.4 g. (0.0082 mole) of sodium cyanide are dissolved in 4 ml. of water, the solution is cooled to 0° C. and the above solution of the diazonium salt is added dropwise. The addition having been completed, the reaction mixture is stirred at 0° C. for 15 minutes and the precipitated crystals are filtered, washed with water and dried. Thus 1.6 g. of 2-methoxy-5-chloro-benzene-diazonium-cyanide is obtained. Yield: 98.5%. M.P.: 130–135° C.

The fungicidal activity of the product is shown by the following tests:

The toxicity of the product is extremely low. If administered orally in a dose of 1000 mg./kg. to mice, the animals are not killed. $LD_{50}=2000$ mg./kg. p.o. on mice. On the other other hand, the toxicity of Dexon, a known fungicidal agent (p-dimethylaminoazo-sulphonic acid sodium salt) is $LD_{50}=60$–70 mg./kg. p.o. on mice.

The fungicidal activity of the product prepared according to the present example surpasses that of Ziram, a well-known fungicidal agent (zinc-N,N′-dimethyl-dithiocarbamate). The test-compounds were used in the form of an aqueous spray prepared by admixing 50% of the test-compound with 50% of talc and suspending the powder mixture in water. The spray was applied to the test fungi *Alternaria tenuis* and *Botrytis allii*. The 50% inhibition of germination and growth were observed (expressed in the percentage of the untreated control). The results obtained are summarized in the following table:

| | Bath | | Spray | |
|---|---|---|---|---|
| Test compound | Inhibition of germination, γ/ml. | Inhibition growth, γ/ml. | Inhibition of germination, γ/ml. | Inhibition of growth, γ/ml. |
| | *Alternaria tenuis* | | | |
| Compound: | | | | |
| A | 3 | 2 | 30 | 20 |
| B | 30 | 10 | 100 | 10 |
| | *Botrytis allii* | | | |
| Compound: | | | | |
| A | 1 | 1 | 60 | 50 |
| B | 6 | 5 | 500 | 300 |

NOTE.—Compound A=2-methoxy-5-chloro-benzene-diazonium-cyanide; Compound B=Ziram.

The values represent the lowest effective concentrations, which cause an 50% inhibition of growth or germination respectively, expressed in γ/ml.

The product shows a complete inhibition against *Candida albicans* for 24 hours, when used in a concentration of 65γ/ml. It is highly active against *Trychophyton mentagriphypos* and *Trychophyton rubrum*. Against the latter fungi it achieves complete inhibition for 72 hours, when applied in a concentration of 1γ/ml.

What we claim is:
1. 2-methoxy-5-chloro-benzene-diazonium-cyanide.

References Cited

UNITED STATES PATENTS 3,501,455   3/1970   Pluijgers _____ 260—192
2,910,463   10/1959  Urbschat et al. _____ 260—152

OTHER REFERENCES

Keyser et al., Chemical Abstracts, volume 61, 2173 (1964).

Houben-Weyl, "Methoden der Organischen Chemie," volume 10/3, pp. 594–599 (1965).

FLOYD DALE HIGEL, Primary Examiner

U.S. Cl. X.R.

424—226